(12) United States Patent
Heiermann

(10) Patent No.: US 9,316,180 B2
(45) Date of Patent: Apr. 19, 2016

(54) INTERNAL COMBUSTION ENGINE

(71) Applicant: MTU Friedrichshafen GmbH, Friedrichshafen (DE)

(72) Inventor: Joerg Heiermann, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 240 days.

(21) Appl. No.: 13/872,103

(22) Filed: Apr. 27, 2013

(65) Prior Publication Data

US 2013/0232972 A1    Sep. 12, 2013

Related U.S. Application Data

(63) Continuation-in-part of application No. PCT/EP2011/005310, filed on Oct. 21, 2011.

(51) Int. Cl.
| *F02B 33/44* | (2006.01) |
| *F01N 3/05* | (2006.01) |
| *F02B 33/00* | (2006.01) |
| *F02M 25/07* | (2006.01) |
| *F02B 37/013* | (2006.01) |
| *F02B 37/10* | (2006.01) |
| *F02B 37/00* | (2006.01) |

(Continued)

(52) U.S. Cl.
CPC .......... *F02M 25/0711* (2013.01); *F02B 37/004* (2013.01); *F02B 37/013* (2013.01); *F02B 37/04* (2013.01); *F02B 37/10* (2013.01); *F02B 37/168* (2013.01); *F02M 25/0707* (2013.01); *F02M 25/0732* (2013.01); *F02M 25/0739* (2013.01); *Y02T 10/121* (2013.01); *Y02T 10/144* (2013.01)

(58) Field of Classification Search
CPC ...... F02B 37/007; F02B 37/013; F02B 37/10; F02B 37/004; F02B 37/04; F02B 37/168; F02M 25/0707; F02M 25/0709; F02M 25/071; F02M 25/0711; F02M 25/0712; F02M 25/07115; F02M 25/0717; F02M 25/0732; F02M 25/0739; F01N 1/14
USPC ................ 60/602.5, 612, 606, 280, 289, 293; 123/562

See application file for complete search history.

(56) References Cited

U.S. PATENT DOCUMENTS

| 4,215,550 | A | * | 8/1980 | Dinger et al. | .................... 60/606 |
| 6,295,817 | B1 | * | 10/2001 | Abthoff et al. | .................. 60/612 |
| 6,324,846 | B1 | * | 12/2001 | Clarke | ......................... 60/605.2 |

(Continued)

FOREIGN PATENT DOCUMENTS

| CN | 201513258 | 6/2010 |
| CN | 101865018 | 10/2010 |

(Continued)

*Primary Examiner* — Thomas Denion
*Assistant Examiner* — Jessica Kebea
(74) *Attorney, Agent, or Firm* — Klaus J. Bach

(57) ABSTRACT

In an exhaust gas turbocharger system for charging an engine including a compressor arrangement at a charging fluid side LL and a turbine arrangement at an exhaust gas side AG, a further compressor which is driven by a separate controllable drive and whose primary side is connected to the charging fluid side LL while its secondary side is connected to the exhaust gas side is provided for compressing charge air taken from the charging fluid side and supply it to the exhaust gas side for assisting driving the exhaust gas turbines so as to maintain them at relatively high speeds in transition periods including engine idling.

14 Claims, 2 Drawing Sheets

(51) Int. Cl.
*F02B 37/04* (2006.01)
*F02B 37/16* (2006.01)

(56) References Cited

U.S. PATENT DOCUMENTS

| | | | |
|---|---|---|---|
| 7,231,760 B2 * | 6/2007 | Busch | 60/280 |
| 7,490,462 B2 * | 2/2009 | Roozenboom et al. | 60/278 |
| 8,061,335 B2 * | 11/2011 | Auffret et al. | 123/568.12 |
| 8,096,123 B2 * | 1/2012 | Liu et al. | 60/605.1 |
| 8,387,382 B1 * | 3/2013 | Dunn | 60/606 |
| 8,479,512 B2 * | 7/2013 | Auffret et al. | 60/605.2 |
| 8,522,756 B2 * | 9/2013 | Vuk et al. | 123/568.12 |
| 8,596,252 B2 * | 12/2013 | Liu et al. | 123/568.12 |
| 8,627,662 B2 * | 1/2014 | Freund et al. | 60/606 |
| 2001/0035171 A1 * | 11/2001 | Kim et al. | 123/568.12 |
| 2010/0122530 A1 * | 5/2010 | French | 60/602 |
| 2011/0265471 A1 * | 11/2011 | Grissom et al. | 60/598 |

FOREIGN PATENT DOCUMENTS

| | | | |
|---|---|---|---|
| DE | 24 35 004 | 2/1976 | |
| DE | 2 121 474 | 12/1983 | |
| DE | 32 25 867 | 1/1984 | |
| DE | 38 07 372 | 9/1989 | |
| DE | 198 37 978 | 11/1999 | |
| DE | 198 37 978 A1 | 11/1999 | |
| DE | 103 15 148 | 11/2004 | |
| DE | 10 2005 012 306 | 9/2006 | |
| EP | 2058504 A2 * | 5/2009 | F02M 25/07 |
| FR | 2 895 454 | 6/2007 | |
| JP | 61201828 A * | 9/1986 | F02B 37/02 |
| JP | 2007 100628 A | 4/2007 | |
| WO | WO 2008/050178 | 5/2008 | |
| WO | WO 2010057910 A1 * | 5/2010 | F02B 37/013 |

\* cited by examiner

INTERNAL COMBUSTION ENGINE

This is a Continuation-In-Part application of pending international patent application PCT/EP2011/005310 filed Oct. 21, 2011 and claiming the priority of German patent application 10 2010 043 027.7 filed Oct. 27, 2010.

BACKGROUND OF THE INVENTION

The invention resides in an internal combustion engine comprising an engine with an exhaust gas side and a charge air side, a charging system including an exhaust gas turbocharger for charging the internal combustion engine with a compressor arrangement on the charge air side and a turbine arrangement on the exhaust gas side and a compressor having a primary side connected to the charge air side and a secondary side connected to the exhaust gas side. The invention also concerns a motor vehicle with an internal combustion engine.

DE 198 37 978 A1 discloses an internal combustion engine with an exhaust gas turbocharger for a two-stage charging of an internal combustion engine and with exhaust gas recirculation wherein an exhaust gas recirculation line extending to a secondary side of a high pressure compressor side is provided.

GB 2 121 4 74 A discloses an internal combustion engine with an exhaust gas turbocharger for two-stage charging of the internal combustion engine. It includes a compressor for supplying compressed air to a pressurized air storage which pressurized air can be supplied to the exhaust gas turbocharger by pedal activation.

The internal combustion engine as described in the first paragraph is disclosed in DE 103 15 148 which is assigned to the assignee of the present invention. This engine includes an exhaust gas turbocharger with, a compressor and a turbine and an additional compressor for compressing ambient air. A valve for switching a flow path of the secondary circuit of the compressor is provided for connecting, in a first position, the secondary side of the compressor with the primary side of the turbine. To this end a suitable connecting line is provided via which air is conducted from the compressor to the primary side of the turbine to thereby increase the speed of the turbine. Because of the so increased speed of the compressor the charge air pressure of the air which is drawn in from the ambient and then compressed is increased. Upon exceeding a limit valve, in a second position of the valve, the air compressed by the compressor can be conducted to the secondary side of the turbine and in this way discharged.

It has been found however, that such an internal combustion engine can still be improved.

It is the object to provide an internal combustion engine with an improved charging system in particular a charging system wherein the compressor is connected in an improved manner so that the internal combustion engine has an improved charge air pressure and improved operating dynamics especially at low engine speeds.

SUMMARY OF THE INVENTION

The object with respect to the internal combustion engine is solved by the invention by an internal combustion engine of the type as described above, wherein, in accordance with the invention it is provided that the exhaust gas system further includes an exhaust gas recirculation with a recirculation line for exhaust gas from the exhaust gas side of the internal combustion engine to the charge fluid side of the internal combustion engine, wherein the exhaust gas turbocharger system includes a low pressure stage and a high pressure stage for a two-stage charging of the internal combustion engine. In accordance with the invention it is further provided that the low pressure stage includes a low-pressure compressor driven by a low-pressure turbine of the compressor arrangement and the high pressure stage includes a high-pressure compressor of the compressor arrangement driven by a high-pressure turbine of the turbine arrangement. Further it is provided in accordance with the invention that a further compressor is provided for the compression of charge air fluid from the low pressure stage and the supply of the compressed charge fluid to the high pressure stage, wherein the primary side of the further compressor is connected to the secondary side of the low pressure compressor and the secondary side of the further compressor is connected to the primary side of the high pressure turbine.

The invention is based on the understanding that the charging system of an internal combustion engine can advantageously be improved in particular with engine-internal $NO_x$ reduction by exhaust gas recirculation. In the internal combustion engine according to the invention, an exhaust gas recirculation from the exhaust gas side to the charge air side of the internal combustion engine is provided. In particular, it has been recognized that internal combustion engines, in particular Diesel engines with exhaust gas recirculation and exhaust gas turbocharging can still be improved especially in the low speed operating range. It has been found that at low speeds comparatively high exhaust gas recirculation rates—for maintaining $NO_x$ limits—cannot always be maintained as desired. It has also been found that—with high exhaust gas recirculation rates—insufficient amounts of fresh air may be contained in the charge air supplied to the engine, which may result in a deterioration of the acceleration behavior of a vehicle provided with such an engine. The counter-productive problem may result in a situation in which limit values for $NO_x$ emissions may not be reached and/or the operating dynamics of the vehicle provided with such an engine deteriorates.

The present invention solves this problem by the use of a two-stage exhaust gas turbocharger system of the internal combustion engine, that is, with a low pressure charging stage and a high-pressure charging stage. The inventor has recognized. that the compressor for the pressurizing of the charge fluid can be utilized in a particular advantageous manner if it is used not so much for the compression of the ambient air but rather for the compression of the charging fluid from the low pressure stage and the supply of the compressed charging fluid to the high pressure stage. In accordance with the present invention, the primary side of the compressor is connected to the secondary side of the low pressure compressor and the secondary side of the compressor is connected to the primary side of the high pressure turbine. The invention facilitates in an advantageous manner a particular high pressure increase by means of the compressor in the two stage exhaust gas turbocharger ahead of the high pressure turbine of the turbine arrangement which, in this way, is supplied with a relatively large fluid volume. It has been recognized that in this way a high negative flushing pressure difference that is a negative pressure difference between a pressure at the charging fluid side and a pressure on the exhaust gas side of the internal combustion engine can be achieved so that even at comparatively low engine speeds comparatively high exhaust gas recirculation rates can be achieved. On the other hand, with the comparatively high additional pressure increase ahead of the high pressure turbine by means of the compressor, a high pressure turbocharger can be kept operating at a rather high speed so that, even during stationary or transient operation of internal combustion engine, the pressure of the charge fluid is sufficiently high to provide the needed amount of fresh air. This results in a comparatively low smoke level. In particular, the response behavior of the internal combustion engine is improved especially during partial load operation even with good exhaust gas recirculation rates.

The basic problem of internal combustion engines with, an exhaust gas recirculation according to the above mentioned contradicting problems between exhaust gas recirculation rates on one hand and availability of fresh air on the other hand is solved herewith. It has been found that the concept according to the invention is sufficient to satisfy even stringent $NO_x$ limits by internal engine operating procedures without the need for exhaust gas after-treatment. Yet a comparatively high vehicle operating dynamics can be maintained with the concept according to the invention even at high exhaust gas recirculation rates.

The concept according to the invention is usable in particular in connection with an internal combustion engine of the inline type, be it an in-line four cylinder—or an in-line six cylinder engine. However, the concept is also useable in connection with V-type engines. It is advantageous in particular with medium fast or fast running engines so that high average cylinder pressures can be achieved even at relatively low engine speeds. It has been found that with a fast runner with speeds in the range of 500 and 2300 rpm and in particular speeds between 900 and 2000 rpm a substantial increase in the average pressure of up to 40% can be achieved.

The invention also resides in a vehicle, in particular a commercial vehicle with an internal combustion engine according to the invention. The concept according to the invention has been found to be advantageous also in connection with a tractor, a construction vehicle or a transport vehicle. Other applications for the use of the concept according to the invention as disclosed above are of course possible.

Basically, the exhaust gas recirculation may be provided for also in connection with a single-stage exhaust gas recirculation with the use of one heat exchanger. The exhaust gas recirculation system may include at least one, in particular an adjustable, throttle. The throttle may have the form of a throttle flap or a similar tube closing and/or restricting means. With regard to a two-stage exhaust gas turbocharger, in particular an exhaust gas recirculation in the form of a two-temperature stage exhaust gas recirculation has been found to be advantageous. An exhaust gas recirculation arrangement includes advantageously in a first temperature stage a first heat exchanger and in a second temperature stage a second heat exchanger. By way of the two-temperature stage exhaust gas recirculation a temperature and, in particular, a density of the recirculated exhaust gas can be adjusted in an advantageous manner depending on the engine operating condition, for example during start up or in a stationary or transient operating state. It has been found to be particularly advantageous that the second temperature stage of the exhaust gas recirculation includes a main line—preferably the recirculation line—in which the second heat exchanger is arranged, and also a separate bypass line. The bypass line is connected to the primary side of the second heat exchanger and also to the secondary side and, in this way, forms a bypass path around the second heat exchanger for an exhaust gas to flow around the second heat exchanger. With this arrangement, the second temperature stage of the exhaust gas recirculation can he activated or de-activated as desired. When it is activated, the exhaust gas flows through the heat exchanger; when it is de-activated, the exhaust gas bypasses the heat exchanger while flowing through the bypass line.

In order to achieve a sufficient compression of the charge fluid, that is, specifically a mixture of charge air and exhaust gas—it has been found to be advantageous to provide the low pressure stage of the exhaust gas turbocharger at its charging fluid side with a low-pressure heat exchanger. The low pressure heat exchanger is advantageously arranged between the low-pressure compressor and the high pressure compressor. It is also advantageous if the high pressure stage of the exhaust gas turbocharger is provided at the charge fluid side with a high-pressure heat exchanger. A high pressure heat exchanger has been found to be advantageous in order to supply the charge fluid to the internal combustion engine at the lowest possible temperature. Generally, it has been found that a charging fluid compression with a subsequent charging fluid cooling results in an advantageously increased density of the charging fluid so that an air-fuel ratio in the charge air can be particularly high that is a relatively large amount of fresh air can be supplied. This results in comparatively lower $NO_x$ emissions and advantageously also in lower smoke generation.

These advantages are achieved in accordance with the invention mainly by the compressor for the compression of the charging fluid from the low pressure stage and the supply of the compressed charging fluid to the high pressure stage that is the high pressure turbine. In addition, in the way mentioned above a negative flushing pressure difference is increased which results in comparatively high exhaust gas recirculation rates practically over the whole speed range and also in an improved driving dynamics with an improved response of the internal combustion engine even during partial load operation. Depending on needs, the primary side of the compressor may be connected between the low pressure heat exchanger and the high pressure heat exchanger. The connection of the primary side of the compressor to the secondary side of the low-pressure heat exchanger has been found particularly advantageous for an effective and good compression of the charging fluid. However, for example, in coordination with a dimensioning of the heat exchanger, in particular a low pressure heat exchanger and/or a high pressure heat exchanger, the primary side of the compressor may also be directly connected between the low pressure compressor and the low pressure heat exchanger. It is also possible to provide for example the low pressure stage of the exhaust gas turbocharger at the charge fluid side without a heat exchanger. If necessary, the exhaust gas turbocharger may be provided only with a single heat exchanger with appropriate dimensioning even with a two stage arrangement. The primary side of the compressor can in this case be connected directly between the low pressure and the high pressure compressor.

It is also to be understood that the charging fluid is basically charge air. Still, a recirculation line of the exhaust gas recirculation system may be so connected to the charging fluid side of the internal combustion engine that the recirculated exhaust gas can be supplied to the charging fluid side at different locations as needed. For example, exhaust gas can be supplied to the charging fluid side at a secondary side of a high pressure compressor and/or a high pressure heat exchanger in particular directly at the charging fluid manifold of the internal combustion engine. Also further developments are possible wherein the recirculation line for the exhaust gas is recirculated from the exhaust gas side of the internal combustion engine to the charging fluid side of the internal combustion engine in a charging fluid-side high pressure stage and/or a charging fluid side low pressure stage of the exhaust gas turbocharger that—is, for example at the primary side of the high pressure compressor or the primary side of the low pressure compressor. In particular, measures may foe taken for preventing fouling of a heat exchanger.

In a particular preferred further development, the compressor can be driven directly by the crankshaft of the internal combustion engine. In an alternative or additional further development, the compressor may also be operated by a drive which is separate from the internal combustion engine. A suitable drive means for the compressor is a clutch and or a drive unit arranged between the internal combustion engine or respectively, the separate drive and the compressor. The drive means for the compressor may also be a belt, a chain, a gear or a similar connection to the crankshaft of the internal combustion engine or a separate drive unit. A connecting line at the primary side of the compressor may include a valve in particular a controllable valve. A controllable throttle is also possible. Basically also other means for closing or restricting a pipe may be provided. A valve or a throttle is well suitable for controlling a charging fluid flow to the compressor from the low pressure side.

Although not described in detail, the concept of the invention applies also to further developments, wherein a primary side of the compressor is arranged at the secondary side of the low pressure compressor but no charging fluid is supplied directly to the compressor directly from the low pressure stage. For example, also additional charging fluid can be supplied from the high pressure stage or charging fluid can foe supplied to the compressor in combination with additional components or line components of the exhaust gas turbocharger.

Below exemplary embodiments of the invention will be described with reference to the accompanying drawings. The exemplary embodiments are not shown to scale. The drawings serve only to facilitate the understanding of the invention. They are schematic and distorted for better explanations. With regard to teachings directly recognizable from the drawings reference is made to the respective state of the art. It is to be understood that various modifications with respect to form and details of an exemplary embodiments are possible without deviation from the concept of the invention. The features of the invention as shown in the drawings or described in the description and the claims may be essential either alone or in any combination for the further development of the invention. The general concept of the invention is not limited to the exact form or detail of the preferred embodiments shown and described below or to an object that would be limited in comparison with the claimed subject matter. In the description identical or similar parts with the same or similar function are designated by the same reference numerals.

DESCRIPTION OF PARTICULAR EMBODIMENTS

Figure 1:
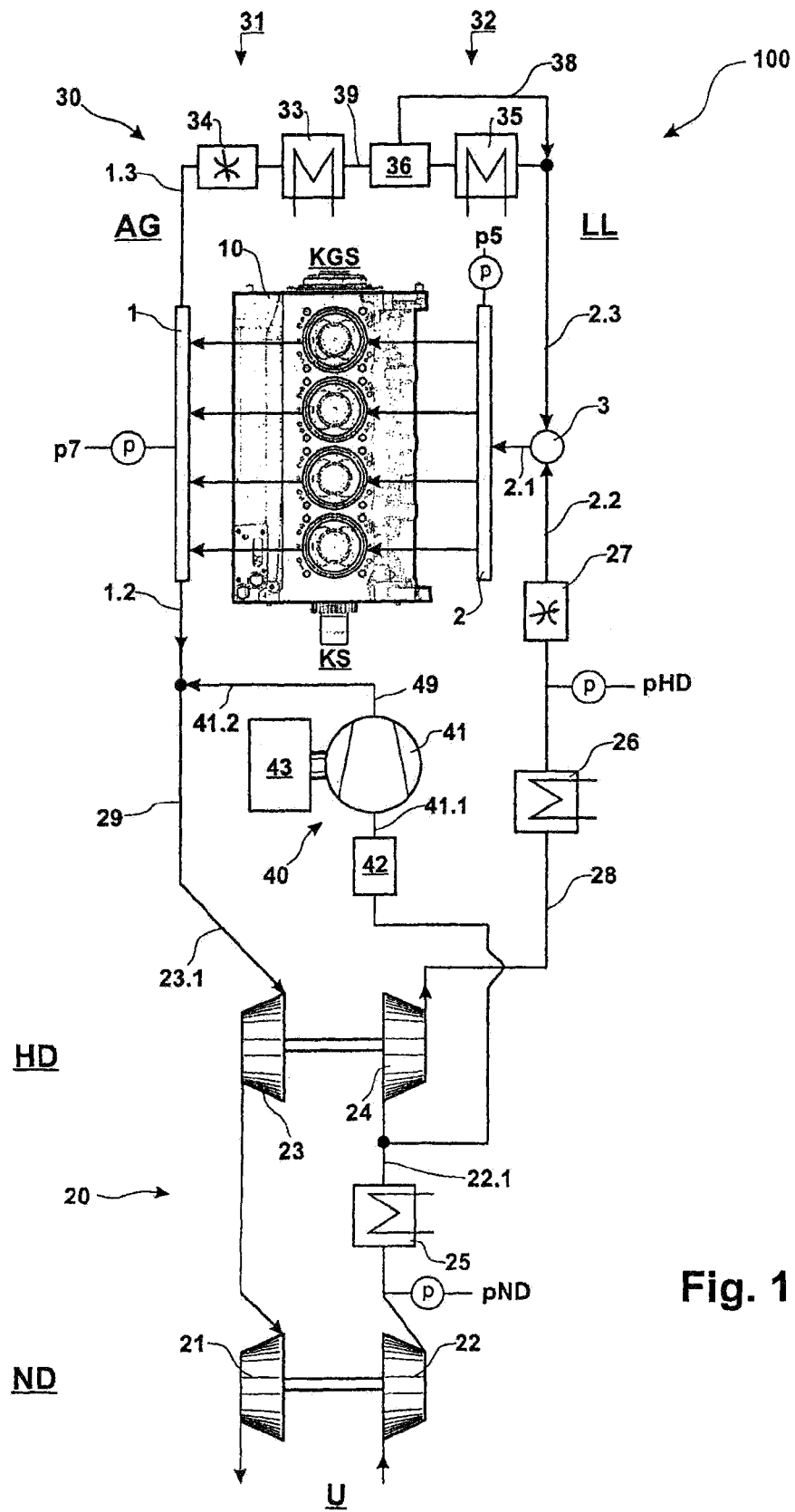
FIG. 1 shows a first embodiment of an internal combustion engine with a compressor for the compression of a charging fluid from a low pressure stage and the supply of the compressed charging fluid to a high pressure stage, as shown the high pressure turbine of a two-stage exhaust gas turbocharger wherein the high pressure side of the compressor is disposed between the low pressure heat exchanger and the high pressure compressor.

FIG. 1 shows an internal combustion engine 100 with an engine 10 and a charging system comprising an exhaust gas turbocharger 20 and an exhaust gas recirculation system 30. The engine 10 is shown, in the form, of a four-cylinder inline engine as a fast running engine operating at speeds in the range of 800 to 2500 rpm. The engine 10 has an exhaust gas side AG for conducting exhaust gas from the exhaust gas manifold 1 of the engine 10 via an exhaust line 1.2 to the exhaust gas turbocharger 20 and an exhaust gas recirculation line 1.3 extending between the exhaust gas manifold 1 and the exhaust gas recirculation system 30. The engine also includes a charging fluid side LL for charging the engine 10 with a charging fluid via a charging fluid intake manifold 2. The charging fluid in the intake manifold 2 is here a mixture of charge air supplied via a charge air line 2.2 from the exhaust gas turbocharger 20 and exhaust gas supplied via a recirculation line 2.3 from the exhaust gas recirculation system 30 mixed in amounts depending on the operating conditions of the engine 10. The charge air and the exhaust gas are mixed in a mixer 3 for forming the charging fluid from the charge air and the exhaust gas and supplied to the intake manifold 2 via an intake line 2.1. The arrows shown in FIG. 1 indicate in each case the flow direction of the charging fluid at the charging fluid side LL and respectively of the exhaust gas at the exhaust gas side AG, and also the direction of the fluid flows in the area of the engine 10.

Figure 2:
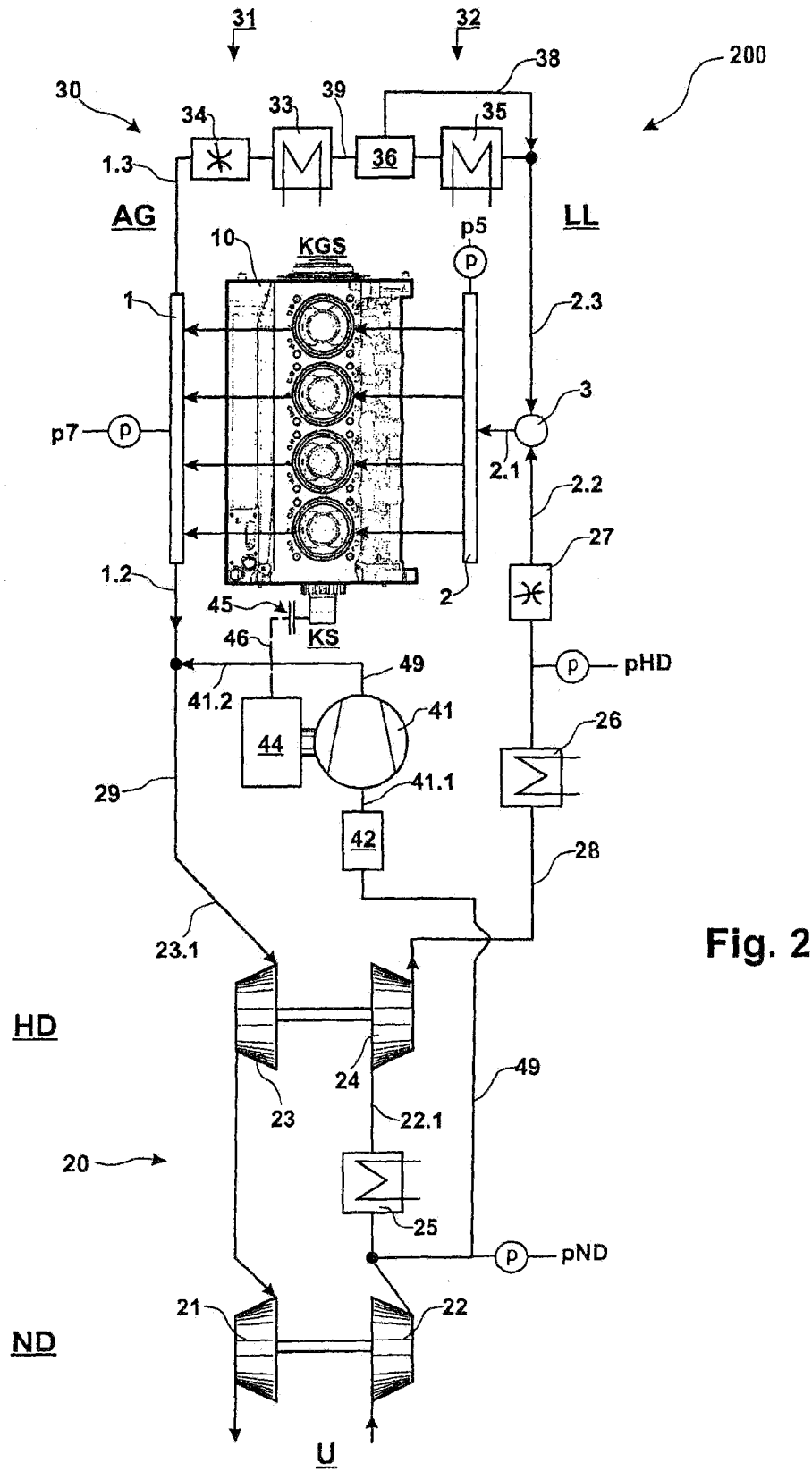
FIG. 2 shows an embodiment of an internal combustion engine with a compressor for the compression of the charging fluid from the low pressure stage and the supply of the compressed charging fluid to the high pressure stage that is the high pressure turbine of a two-stage exhaust gas turbocharger system wherein the inlet side of the compressor is connected between the low pressure compressor and the low pressure heat exchanger.

KS designates the power output end of the engine 10 that is the end of the engine 10 where a transmission or as shown 1 FIG. 2 a clutch for connecting further drive systems to the crankshaft of the engine would be arranged. KGS indicates the opposite end of the engine 10.

The charging system of the engine 10 includes in the shown embodiment an exhaust gas recirculation system 30. The exhaust gas recirculation system 30 has a first stage 31 and a second stage 32. The first stage includes a high temperature heat exchanger 33 with a throttle 34 arranged upstream of the high temperature heat exchanger 33.

Below, the input end of a component will generally be called the primary side and the exit end of a component will be called the secondary side when referring to the normal operation of the engine 10 that is for a flow direction of a charging fluid or respectively exhaust gas as shown in FIG. 1.

The exhaust gas recirculation system 30 includes a recirculation line 39 which extends from the exhaust gas line 1.3 to the exhaust gas recirculation line 2.3 for re-circulating exhaust gas from the exhaust gas side AG of the engine 10 to the charging fluid side LL of the engine 10. The re-circulation line 39 which is the main return line is at its primary side connected to a second heat exchanger 35 of the second stage 32 of the exhaust gas recirculation system 30. Upstream of the second heat exchanger 35, that is at its primary side, a valve 36 is arranged. Next to the second heat exchanger 35 arranged in the main line 39 the second stage 32 of the exhaust gas recirculation system 30, a separate bypass line 38 is provided which is connected to the primary end and the secondary end of the heat exchanger 35 for bypassing the heat exchanger 35, The exhaust gas conducted from the exhaust gas recirculation line 1.3 to the return line 39 can therefore be pre-cooled by the high temperature heat exchanger 33 in an amount controlled by the throttle 34 and then—depending on the operating condition of the internal combustion engine—conducted through the second low temperature heat exchanger 33 for further cooling in an amount as controlled by the valve 36 and/or through the bypass line 38. Subsequently, the exhaust gas cooled as needed is conducted from the main exhaust gas line and/or the bypass line 38 via the exhaust gas recirculation line 2.3 at the charging fluid side LL of the engine 10 to the mixer 3 where it is mixed with the fresh air supplied via the charge air line 2.2 and supplied to the charging fluid intake manifold 2.

In the shown embodiment, the exhaust gas turbocharger 20 is designed for a two-stage charging of the engine 10 with a low pressure stage ND and a high pressure stage HD. The low pressure stage ND includes a low pressure compressor 22 which is driven by a low pressure turbine 21. The high pressure stage HD includes a high pressure compressor 24 which is driven by a high pressure turbine 23. The components of the low pressure stage ND are arranged at the charge air side LL in a charge air line 28 extending from the ambient U to the mixer 3.

In a certain known operating state, the internal combustion engine 100 may be operated as follows: Fresh air is taken in from the ambient U as charge air and compressed by the low pressure compressor 22 of the low pressure stage HD of the exhaust gas turbocharger. In a low pressure heat exchanger 25 connected to the secondary side of the low pressure compressor 22, the air is then pre-cooled and then further compressed in the high pressure compressor 24 of the high pressure stage HD and then again cooled in a high pressure heat exchanger 26 connected to the secondary side of the high pressure compressor 24 to a temperature suitable for its admission to the engine 10. In a section of the charge air line 28 between the low pressure compressor 22 and the high pressure compressor 21, the air taken in from the ambient is at a first pressure level $P_{ND}$ which is higher than atmospheric pressure and in a section of the charge air line 28 between the high pressure compressor 24 and the mixer 3, it is at a second pressure level $P_{ND}$ which is higher than the low pressure level $P_{ND}$. By means of a further throttle 27 the charge air volume flow in the charge air line 22 is determined, that is the proportion of fresh air in the charge air fluid. As mentioned above, the throttle 34 on the other hand determines the flow volume of exhaust gas in the exhaust gas recirculation line 2.3, that is, the content of exhaust gas in the intake line 2.1. Generally, with a suitable setting of the throttles 34 and 27, the charge air content of the intake fluid is tuned to an operating stage of the engine as provided by the engine speed, that is, an air-fuel ratio $\lambda_g$ is so adjusted that it is as high as possible. This is why the fresh air content should be relatively high since this provides for an effective combustion of the fuel in the engine 10 with a relatively low smoke level. In addition, the exhaust gas turbocharger 20 and the exhaust gas recirculation may foe so adjusted that a comparatively high negative flushing pressure differential, that is, a pressure difference P5-P7 between the charging fluid side LL and the exhaust gas side, is as far at the negative side as possible. The purpose of such a setting is to achieve comparatively high exhaust gas recirculation rates over most of the engine speed range. In an internal combustion engine 100 as shown in FIG. 1, $NO_x$ limit values are ensured by maintaining comparatively high exhaust gas recirculation rates. Besides, a fresh air supply for forming the charging fluid supplied to the engine 10 via the intake line 2.1 and the intake manifold 2 is positively influenced already by the design of the exhaust gas turbocharger 20 with a low pressure stage ND and a high pressure stage HD. This already basically provides for a good acceleration behavior of the internal combustion engine 100 when installed in a vehicle. After the combustion of fuel injected in the engine into the charging fluid, the exhaust gas generated thereby is discharged to the exhaust gas manifold 1 at the exhaust gas side AG and from there conducted to the exhaust line 1.2.

The exhaust gas is then conducted via a high pressure turbine 23 of the high pressure stage HD and a low pressure turbine 21 of the low pressure stage KB to an exhaust gas discharge line 29.

In a particularly advantageous embodiment of the internal combustion engine 100 within the concept of the invention, the above-mentioned high air/fuel ratio $\lambda_g$ and a relatively high flushing pressure difference P5-P7 as well as a response behavior of the engine 10 even under partial load are achieved in that the exhaust gas turbocharger 20 includes additionally a compressor arrangement 40 disposed in a compressor line 49 extending from the charge air line 28 to the exhaust gas discharge line 49 extending from the charge 28 to the exhaust gas discharge line 29. The compressor 41 provided for the compression of charge air from the low pressure stage ND at the charging fluid side LL—that is starting at the low pressure level PSD and supplying the further compressed charge air to the high pressure turbine 23 of the high pressure stage HD at the exhaust gas side AG. To this end, the primary side 41.1 of the compressor 41 is connected to the secondary side 22.1 of the low pressure compressor 22 and the secondary side 41.2 of the compressor 41 is connected to the primary side 23.1 of the high pressure turbine 23. That is, the compressor line 49 is connected to the charge air line 28 and the exhaust gas discharge line 29. As already noted charge air of a pressure level m which is at a pressure higher than atmospheric pressure and provided by the low pressure compressor 22 is supplied to the compressor 41. The valve 42 in the compressor line 49 at the primary side 41.1 of the further compressor 41 permits the supply or the cutting off of the air flow through the further compressor 41. In the shown embodiment, the valve 42 is a so-called black/white valve which is either closed or open.

The further compressor 41 is driven in the shown embodiment by a separate drive 43/44 for example by an electric motor 43.

With the described further development of the internal combustion engine 100, the further compressor 41 is an additional mechanical charger and withdraws from the low pressure stage NO charge air at a pressure level $P_{ND}$ which it compresses further for supplying it to the high pressure turbine 23. In this way, the flushing pressure difference P5-P7 mentioned earlier is further moved to the negative as a result of the additional pressure build-up at the primary side 23.1 of the high pressure turbine 23 because of the compression of charge air by the further compressor 41 ad delivering the compressed air to the high pressure turbine 23. The high pressure turbine 23 and, consequently, the high pressure turbocharger or respectively the high pressure stage HD of the exhaust gas turbocharger 20 can thereby be maintained at high speed or, respectively, accelerated so that also during transient operating stages of the engine 10 a sufficient charge air pressure is available at the charge air side LL, that is, sufficient fresh air is supplied to the mixer 3 via the charge air line 28. This measure also serves the further improvement of the airfuel content $\lambda_g$. In addition, this also has a positive effect on the compressor arrangement 40 at all engine speeds also at the engine speeds between 900 and 2000 rpm mentioned earlier. In particular, at comparatively low engine speeds advantageously high medium cylinder pressures can be achieved which are at least 25% above the normal medium pressures of comparable engines. As a result, in the operation of the engine 10 the highest possible exhaust gas recirculation rates can be obtained while high driving dynamics even at low engine speeds are obtained. This is achieved by an improved engine response also during partial load operation.

FIG. 2 shows an embodiment of an internal combustion engine 200 which is slightly different from that shown in FIG.

1. However, for simplicity reasons identical or similar parts with identical or similar functions are designated by the same reference numerals. Below, only features which differ from the internal combustion engine 100 are described. Different from the internal combustion engine 100 where the compressor line 49 is connected to an area of the charge air line 28 downstream of the low pressure compressor 22 between the low pressure heat exchanger 25 and the high pressure compressor 24, the compressor line 49 of the internal combustion engine 200 is connected to the charge air line 28 between the low pressure compressor 22 and the low pressure heat exchanger 25. Different from the internal combustion engine 100, the compressor line 49 consequently starts at a primary side of the low pressure heat exchanger 25 whereas in the internal combustion engine 100 the compressor line 49 extends from the secondary side of the low pressure heat exchanger 25. In both cases, the compressor line 49 extends from the secondary side 22.1 of the low pressure compressor 22 and connects to the primary side 41.1 of the further compressor 41 and further to the primary side of the turbine 23. The embodiment of the internal combustion engine modified in this way is advantageously suitable in particular for operating conditions in which in particular the temperature level of the compressed air in the low pressure stage ND is still sufficiently small to permit further compression by the compressor 41. In a comparatively compact variant which is not shown herein, it has been found to be advantageous to provide only the high pressure heat exchanger 26 and install the exhaust gas turbocharger 20 without the low pressure heat exchanger 25. In this case, like in FIG. 1, the primary side 41.1 of the further compressor in the line section of the charge air line 20 is connected between the low pressure compressor 22 and the high pressure compressor 22.

A further difference from the combustion engine 100, the internal combustion engine 200 includes a compressor 41 whose drive 44 is activated via a clutch 45 and includes a transmission means 46 such as a belt, a chain, a gear or a similar connection with the crankshaft at the output shaft end KS of the engine 10 for being driven thereby mechanically by the engine 10.

In summary, the invention resides in an internal combustion engine 100, 200 comprising:
- an exhaust gas turbocharger system 20 for charging the engine 10 including a compressor arrangement at the charging fluid side LL and a turbine arrangement at the exhaust gas side AG,
- a further compressor 41 whose primary side 41.1 is connected to the charging fluid side LL and whose secondary side 41.2 is connected to the exhaust gas side AG. In accordance with the invention, the charging system further includes:
- an exhaust gas recirculation system 30 with a recirculation line 39 for returning exhaust gas from the exhaust gas side AG of the engine 10 to the charging fluid side LL of the engine 10 wherein the exhaust gas turbocharger 20 for a two-stage charging of the engine 10 includes a low pressure stage ND and a high pressure stage HD wherein the low pressure stage MD includes a low pressure compressor 22 which is driven by a low-pressure turbine 21, and the high pressure stage HD includes a high pressure compressor 24 which is driven by a high pressure turbine 23 and wherein
- the further compressor 41 is provided for compressing charge air taken from the low pressure stage ND and supplying the compressed charge air to the high pressure stage HD, its primary side 41.1 being connected to the secondary side 22.1 of the low pressure compressor 23 and its secondary side 41.2 being connected to the primary side 23.1 of the high pressure turbine 23.

| | Listing of reference numerals |
|---|---|
| 1 | Exhaust gas manifold |
| 1.2 | Exhaust line |
| 1.3 | Exhaust gas recirculation line |
| 2 | Charging fluid intake manifold |
| 2.1 | Intake line |
| 2.2 | Charge air line |
| 2.3 | Exhaust gas recirculation line |
| 3 | Mixer |
| 10 | Engine |
| 20 | Exhaust gas turbocharger |
| 21 | Low pressure turbine |
| 22 | Low pressure compressor |
| 22.1 | Secondary side of the low pressure compressor |
| 23 | High pressure turbine |
| 23.1 | Primary side of high pressure turbine |
| 24 | High pressure compressor |
| 25 | Low pressure heat exchanger |
| 26 | High pressure heat exchanger |
| 27 | Further throttle |
| 28 | Charge air line |
| 29 | Exhaust gas discharge line |
| 30 | Exhaust gas recirculation system |
| 31 | First stage |
| 32 | Second stage |
| 33 | High temperature heat exchanger |
| 34 | Throttle |
| 35 | Second heat exchanger |
| 36 | Valve |
| 38 | Bypass line |
| 39 | Recirculation line |
| 40 | Compressor arrangement |
| 41 | Additional compressor |
| 41.1 | Primary side of the compressor 41 |
| 41.2 | Secondary side |
| 42 | Valve |
| 43 | Separate drive |
| 44 | Drive by crankshaft |
| 45 | Clutch |
| 46 | Drive means |
| 49 | Compressor line |
| 100, 200 | Internal combustion engine |
| AG | Exhaust gas side |
| HD | High pressure stage |
| KGS | Opposite end |
| KS | Engine power output end |
| LL | Charging fluid side |
| ND | Low pressure stage |
| $P_{ND}$ | Low pressure level |
| $P_{HD}$ | High pressure level |
| U | Ambient |

What is claimed is:

1. An internal combustion engine (100, 200) comprising:
an engine (10) having an exhaust gas side (AG) and a charging fluid side (LL) and,
a charging system with
a two-stage exhaust gas turbocharger system (20) for charging the engine (10) including a compressor arrangement at the charging fluid side (LL) and a turbine arrangement at the exhaust gas side (AG) comprising a low pressure stage with a low pressure turbocharger having a low pressure compressor (22) driven by a low pressure turbine (21), a high pressure stage including a high pressure turbocharger having a high pressure compressor (24) driven by a high pressure turbine (23),
a further compressor (41) having a primary side (41.1) connected at the charging fluid side (LL) and a secondary side (41.2) connected at the exhaust gas side (AG) and being driven by a separately controllable drive device (43, 44), the charging system further including:
an exhaust gas recirculation system (30) with a recirculation line (39) extending from an engine exhaust manifold (1) to an engine intake manifold (2) for returning exhaust gas from the exhaust gas side (AG) of the engine (10) to the charging fluid side (LL) of the engine (10) and
the further compressor (41) for compressing charge air having the primary side (41.1) which is connected to an outlet side (22.1) of the low pressure compressor (22) and the secondary side (41.2) being connected to an intake/suction side (23.1) of the high pressure turbine (23).

2. The internal combust on engine (100, 200) according to claim 1, wherein the exhaust gas recirculation system (30) includes at least one heat exchanger (33) for cooling the exhaust gas returned to the charging fluid side.

3. The internal combustion engine (100, 200) as defined in claim 1, wherein the exhaust gas recirculation system (30) includes at least one adjustable throttle (34).

4. The internal combustion engine (100, 200) according to claim 1, wherein the exhaust gas recirculation system (30) includes a heat exchanger (33) and a second heat exchanger (35) arranged in series with the first heat exchanger (33).

5. The internal combustion engine (100, 200) according to claim 4, wherein the second heat exchanger (35) has an inlet side end an outlet side and a bypass line (38) is connected to the inlet and to the outlet side of the second heat exchanger (35) for bypassing the second heat exchanger (35).

6. The internal combustion engine (100, 200) according to claim 1, wherein a low pressure heat exchanger (25) is arranged between the low pressure compressor (22) and the high pressure compressor (24).

7. The internal combustion engine (100, 200) according to claim 6, wherein the primary side (41.1) of the further compressor (41) is connected between the low pressure heat exchanger (25) and the high pressure compressor (24).

8. The internal combustion engine (100, 200) according to claim 6, wherein the primary side (41.1) of the further compressor (41) is connected between the low pressure compressor (22) and the low pressure heat exchanger (25).

9. The internal combustion engine (100, 200) according to claim 8, wherein the primary side (41.1) of the further compressor (41) is connected to the charging fluid side between the low pressure compressor (22) and the high pressure compressor (24).

10. The internal combustion engine (100, 200) according to claim 1, wherein the separately controllable drive device (43, 44) is one of an electric motor (43) and a crankshaft drive (44) connected to the engine (10) to be driven thereby.

11. The internal combustion engine (100, 200) according to claim 10, wherein the crankshaft drive (44) for the further compressor (41) comprises a transmission (46) including one of a gear drive, a belt and a chain drive and a clutch (45) for selective connection to the camshaft of the engine.

12. The internal combustion engine (100, 200) according to claim 1, wherein a compressor line (49) at the primary side (41.1) of the further compressor (41) includes one of an on/off valve and a control valve (42).

13. The internal combustion engine (100, 200) according to claim 1, wherein the engine. (10) is one of an inline engine and a V-type engine in the form of one of a medium-fast running engine with an operating speed range of 350-900 rpm and a fast running engine with an operating speed range of 500-2300 rpm.

14. A motor vehicle in the form of a tractor, a construction vehicle or a transport vehicle with an internal combustion engine (100, 200) according to claim 1.

\* \* \* \* \*